Patented Jan. 4, 1949

2,458,143

UNITED STATES PATENT OFFICE 2,458,143

FIRE RESISTANT ASPHALT ROOFING

Frank B. Burns, Chicago, Ill., Millard S. Larrison, Frankford, Pa., and Morton C. Higgs, North Riverside, Ill., assignors to United States Gypsum Company, Chicago, Ill., a corporation of Illinois No Drawing. Application August 7, 1943, Serial No. 497,870

2 Claims. (Cl. 117—30)

This invention pertains to a fire resistant asphalt base covering, more commonly referred to as asphalt shingles and siding. Though this invention is directed to the improvement in the products of the roofing industry, its extensions and adaptations can be applied with equal effectiveness to related fields, particularly where fire resistant coverings comparable in quality to asbestos coverings are desired.

At the present time the conventional asphalt composition shingles and protective coverings have not been successful in meeting the rigid requirements of fire underwriters to qualify for class B or class A label approval. Protective coverings with a base of asbestos, metal, clay and other non-inflammable materials have at times been able to qualify for class B or class A label approval.

It is therefore but one of the many objectives of this invention to improve the fire resistance of asphalt composition coverings, as shingles and the like to equal or surpass the asbestos, etc., type of coverings that now qualify for class B or class A label rating and at the same time retain and improve all the excellent qualities of waterproofness, self joint sealing and self healing, workability, flexibility, weather resistance, ease of application, etc., that are naturally inherent in this excellent product.

It is therefore possible by following the teachings of this invention, as more fully described hereinbelow, to produce an improved fire resistant asphalt composition covering that will not only qualify for the class A and class B fire rating label, but also can be used without an underlying felt as required by the fire underwriters to obtain class A or class B label rating. It is obvious that the savings not only in cost of materials but also in construction are a material advantage. In addition and unlike prior art asphalt composition coverings this improvement of the covering art will not separate or delaminate between the coatings and the saturated felt when it is exposed to high heat as normally encountered in conflagrations.

This fire resistant asphalt composition covering and the improved product of this invention is obtained by combining a special type of non-flowable, heat intumescing and encrustating coating composition described in detail in a copending application, Serial No. 497,869, with an improved felt containing either asbestos or mineral wool more fully described in a copending patent application, Serial No. 497,868, now abandoned. For reasons of cost and flexibility of operations the latter is the preferred type of felt though both together or singly may be used on occasion.

This combination of an improved non-flowable, heat intumescing and encrustating coating composition and the improved felt containing definite amounts of combustible and incombustible fibrous matter, which on burning out forms a coherent, strong, reticulated ash structure to serve as a base for the coating is very important and essential to produce an improved asphalt composition covering characterized by its ability to withstand the severe fire, flame, and fire brand conditions that are met by asbestos, etc., coverings qualifying for a class A or class B label rating. The coating composition by itself or in combination with a conventional felt base will not qualify. Neither will the improved felt in combination with a conventional coating qualify for class A or class B rating. It is, therefore, apparent that the two components are a true combination since neither of them alone or in combination with conventional roofing material components are able to withstand the rigors of tests to qualify for class A or class B label rating.

For sake of simplicity and clarity and to further illustrate the principles underlying this invention, each of the components and the combination will now be described in greater detail, but it is not intended that the same shall be considered as limitations for obviously there are a number of adaptations, extensions, variations and permutations that can readily be considered as within the spirit of this invention as defined by the hereunto appended claims.

COATING COMPOSITION

The coating composition which is disclosed and covered in patent application Serial No. 497,869 has as its basic material a bituminous substance such as asphalt. Incorporated with this thermo-plastic material are materials which stop the flow of the bitumen when they are subjected to heat and also form a crust during the process of burning. In the preferred formula, as given in said application, ground coking coal, asbestos fiber and ground limestone, either alone or in combination, are described and used. This composition besides others can be used but it is used herein as a typical example of a suitable coating.

Formula 1

| | Parts by weight |
|---|---|
| Coating asphalt—195–200 grade | 50.0 |
| Asbestos: | |
|    7K grade | 6.0 |
|    6D grade | 10.0 |
| A bituminous coal ground 100% minus 100 mesh having coking properties—as Sewell seam coal | 14.0 |
| Limestone dust | 20.0 |

The coating asphalt is heated to a molten state and the various other ingredients are added thereto. The resultant mixture will be found to be readily applicable to the surface of the special type of asphalt saturated sheet, which will be subsequently described, and can be applied in much the same manner as any other coating, using, if desired, the conventional asphalt composition shingle machine.

In applying this coating to the felt it is desirable to control the temperature of the coating mixture within certain limits depending on the ingredients used in the mixture. If a high temperature is used, some coking will take place which liberates a quantity of gas. This interferes with handling and proper spreading. If the temperature is too low, the consistency of the mix is too high for proper spreading on the surface of the felt. However, these limits can readily be determined by those skilled in the art.

After the coating is applied, regular mineral granules are sprinkled upon and rolled onto the surface in accordance with the usual practice.

ASBESTOS FELT

As previously mentioned, felts of asbestos and mineral wool may be used, it is desirable that each belt be described singly to point out the principles of this combination.

The felt can be made with much the same type of equipment now used in the manufacture of ordinary rag roofing felt. However, between 38 and 52 per cent by weight of the organic fiber commonly used in making the felt is replaced with asbestos fiber. To obtain superior felting, saturation, weather resistance, and fireproofing properties not obtained in felt of this type in the past, it is necessary to follow carefully the process described hereinbelow and more fully described in a copending patent application Serial No. 497,868. In order to obtain these improved properties, it has been discovered that a number of important factors must be properly balanced.

First, it has been discovered that to obtain most effective results in the final combination, it is desirable that the amount of asbestos fiber used must be substantially between 38 and 52 per cent by weight of the felt. Second, the asbestos must possess right felting qualities. It must not be too slimy so as to give difficulty in forming the sheet upon the felt machine. Likewise, it must not be too harsh as it has been found that a harsh fiber will not give the desirable slight movement during burnout. The asbestos must be substantially free of splinters, talc and serpentine impurities. It has been found that in general chrysotile asbestos fiber is very well suited for the purpose.

It is also very important that the proper fiber sizes are used in the preparation of this felt. Any of the fiber grades in the No. 5 class (as defined by the trade) can be used or a combination of 5R or better with 6D and/or 7K or better can be used, or any combination of asbestos grades giving substantially the same fiber characteristics. A complete, detailed description of the characteristics of the various grades of asbesos fibres can be found on pages 69 to 71 of the United States Bureau of Mines Bulletin 403 on Asbestos issued in 1937.

The following is but one example of a formula of a furnish that will give a roofing felt having the desired characteristics:

| | Parts by weight |
|---|---|
| 5K asbestos fiber | 25 |
| 6D asbestos fiber | 7 |
| 7K asbestos fiber | 13 |
| Rag stock | 27.5 |
| Mixed paper stock | 27.5 |
| Total | 100.0 |

Of course, other obvious variations can be made in rag stock, paper stock, etc., without departing from the principles of this invention.

A roofing felt prepared in this manner will absorb at least 85 per cent by weight of an asphalt saturant, thus giving a felt that will have improved weather resistance, in comparison with the conventional asbestos felt. In addition, this felt when the organic constituents are burned out, will produce a continuous relatively strong and coherent reticulated structure to serve as a supporting base for the intumesced and encrusting residuum of the fire destroyed, improved coating. It is this residuum structure in combination with each other that provides excellent fireproofing qualities and characteristics that qualify to meet at least class B label requirements.

MINERAL WOOL FELT

Though an asbestos felt as described above can be used, a mineral wool felt base is preferred as a base for the improved coating composition. The felt can be formed upon a regular roofing felt machine, provided the mineral wool complies with certain desirable requirements described below.

The mineral wool fibers should have approximately a diameter between 2 and 8 microns and be substantially free from non-fibrous material such as beads, bubbles, and other extraneous matter. Fibers should be fairly long and flexible and not easily etched by water. Not less than 30 nor more than 55 per cent by weight of such fibers should be used. The remaining fibers are of organic nature and are substantially the same as those ordinarily used in making roofing felt.

The mineral wool, either as it is formed or before it is made into a felt, is treated to remove beads and other impurities preferably by passing it in a water suspension over a riffle or similar type of equipment. The fibers are then blended in proper proportions with the other constituents like rag, kraft, etc., fibers, to form a felt on the standard paper making machine.

Though various wools may be used, it has been found that wool of the following composition range possesses the proper flexibility, freedom from etching and proper resilience.

| | Minimum | Maximum |
|---|---|---|
| | Percent | Percent |
| $SiO_2$ | 40 | 45 |
| $Al_2O_3$ | 3 | 15 |
| $CaO$ | 12 | 24 |
| $MgO$ | 0 | 5 |
| $Fe_2O_3$ | 15 | 35 |
| $K_2O$ and $Na_2O$ | 0 | 5 |

Felts made with mineral wool in accordance with the disclosure of this invention will absorb more asphalt and absorb it more quickly than the regular felt used in commerce. Also, after the felt has been subjected to a burnout, the ash forms a strong and coherent reticulated structure.

Though only felts of a mineral wool or asbestos type are shown above, it is obvious and within the scope of this invention to use a mixture of each stock to form a felt base suitable for saturation with asphalt.

In combining a saturated felt of the types described hereinabove, with a coating composition also described hereinabove, a product of an asphaltic nature is obtained that readily passes all the requirements of class B or A label service as specified by the Underwriters' Laboratories.

The method of testing and conditions for various class label requirements are fully described in a publication of the Underwriters' Laboratories, dated February 1, 1939, entitled "Description of Test Methods to Determine Eligibility of Roofing for Classifications A, B and C."

In order to obtain a class A, B or C rating by the Underwriters' Laboratories, the roof coverings when applied under certain conditions and tested by their procedure must pass the requirements known as flame exposure, spread of flame and burning brand. Class A requirements are most severe, and in general clay roof tile, asbestos-cement tile, and similar materials may qualify. Asbestos felt base roofing with conventional asphalt coating will not always qualify. Class B requirements are less severe, while Class C requirements are still lower. High grade and heavy weights of conventional grades of commercially available asphalt roofing may qualify for class C rating.

Tests made in accordance with the specifications of the Underwriters' Laboratories upon asphalt roofing made following the principle of this invention indicated that products have passed at least the class B label requirements. For some types of shingles the requirements for the class A label were met. This performance is outstanding in comparison with prior art asphalt composition roofing which does not meet even the class B label requirements.

RESULTS OF TESTS

Tests were conducted by an unbiased testing institution on coverings made according to principles of this invention.

*Formula 14—Coating*

| | Parts by weight |
|---|---|
| Coating asphalt | 50 |
| Coking coal from Sewell seam, all through 100 mesh | 14 |
| Asbestos King's D equivalent to 7K | 16 |
| Limestone filler as used in asphalt roofing manufacture | 20 |

The above coating composition was applied in quantities described below to a saturated felt containing 34% of mineral wool fiber and 66% cellulosic fiber as ordinarily used in the manufacture of roofing felt. After the coating was applied, standard green mineral granules were rolled onto the coating in the usual conventional way.

Though we have found coking coals of the Sewell Seam vein or similar type to be suitable, it is obvious that similar materials that intumesce or act similarly to Sewell Seam coal can be used in place thereof. Likewise unexpanded vermiculite comminuted sufficiently to disperse readily in the asphalt coating, can be used. However, it should be noted that materials used should not be adversely affected by the temperature of the liquified asphalt coating into which they are dispersed for otherwise they will lose their physical characteristic of intumescibility.

The following table shows the amount of materials used in preparing the improved composition roofing. For sake of completeness, an asbestos felt base improved composition roofing is also given. The formulae are based upon the conventional factory square of 108 square feet.

| Type of Asphalt Shingle | 210# Thick Butt | | | 11¼" Hexagon | | |
|---|---|---|---|---|---|---|
| Type of Felt | All Rag | 34% Mineral Wool | 50% Asbestos | All Rag | 34% Mineral Wool | 50% Asbestos |
| Felt, lbs. per 480 sq. ft. | 50 | 50 | 45 | 50 | 50 | 45 |
| Percent Saturation (approximate) | 175 | 175 | 90 | 175 | 175 | 90 |
| Weight of Felt, Lbs. | 11.3 | 11.3 | 10.1 | 11.3 | 11.3 | 10.1 |
| Weight of Saturating Asphalt, Lbs. | 20.0 | 20.0 | 9.1 | 20.0 | 20.0 | 9.1 |
| Weight of Coating Formula 14 above, Lbs. | | 31.7 | 43.8 | | 28.7 | 40.8 |
| Weight of Coating Asphalt, Lbs. | 31.7 | | | 28.7 | | |
| Weight of Granules, Lbs. | 31.0 | 31.0 | 31.0 | 31.0 | 31.0 | 31.0 |
| Weight of Backing, Lbs. | 1.0 | 1.0 | 1.0 | 1.0 | 1.0 | 1.0 |
| Total Weight Lbs. | 95.0 | 95.0 | 95.0 | 92.0 | 92.0 | 92.0 |

The all rag shingle is the regular rag roofing felt and coating asphalt included for the purpose of comparison. Such a roofing will not pass the class B tests, while with the same total weight of materials as ordinarily used for rag felt, the others will pass the class B requirements. The granules are not an important factor in obtaining fire protection but are included in the above to show the complete product.

The fire tests in accordance with the official procedure of the Underwriters' Laboratories mentioned above were made upon the above 11¼" hexagon individuals. The following roof structure coverage was obtained:

| | Per cent of area covered |
|---|---|
| Single layer | 21.76 |
| Double layer | 63.61 |
| Triple layer | 14.63 |
| Quadruple layer | None |
| Total | 100.00 |

This method of application illustrates one type of single coverage shingle.

After testing, these shingles qualified for the following class label rating:

| Test | Class |
|---|---|
| Flame Spread | A |
| Flame | A |
| Brand | B |

The shingles as applied in single coverage method not only passed the requirements of class C label specifications, but also almost good enough to pass all class A requirements. Since it failed, in one respect only, to meet the standards of class A fire brand test, it automatically becomes classified as a class B shingle. Many asbestos type covering sheets are in this class. The outstanding performance of the product of this invention, which normally is considered as inflammable in comparison to asbestos, is almost unbelievable.

To qualify for class A label service, the roofing elements must be of such design that a portion of the covered roof area has quadruple layer protection, a substantial percentage of triple layer coverage and some double layer coverage but no single layer coverage.

Class A procedure tests were also conducted upon asphalt roofing made in accordance with the principles of this invention but formed into 3-in-1 square tab thick butt shingles 17″ x 36″, with a 5″ exposure and cutouts between tabs limited to ⅜″ x 5″.

These shingles had the following type of coverage:

| | Per cent of area covered |
|---|---|
| Single layer | None |
| Double layer | 1.88 |
| Triple layer | 59.37 |
| Quadruple layer | 38.75 |
| Total | 100.00 |

These illustrate one type of a full double coverage shingle. When tested in accord with Underwriters' Laboratories tests, the following results were obtained.

| Test | Class |
|---|---|
| Flame Spread | A |
| Flame | A |
| Brand | A |

This highly improved asphalt composition shingle has great commercial utility since much greater fire protection can be obtained for roofs at substantially little increase in cost. Asphalt composition roofing is not only economical but also under action of heat from the sun forms a self sealing joint which is highly desirable. In addition to the above qualities, and in accordance with the principles of this invention, asphalt composition coverings now have fire resistant qualities.

The terms asphalt or asphaltic material define a bituminous substance, regardless of origin, substantially hard at room temperatures, and having plastic flow when heated and also having high weather resistance. It can be derived from petroleum, oil, shale, coal tar distillation, natural asphalts and still be within the scope of this invention, if it can qualify as a roofing material.

In order to indicate clearly the essence of this invention as limited only by the claims, it can be summarized as the application of a non-flowable asphalt type, crust forming intumescent coating, preferably containing a coking bituminous coal, to a roofing felt of high asphalt saturation, but composed of sufficient inorganic fibrous materials of the proper type, preferably mineral wool, to form a strong cohesive reticulated ash structure when burned.

It is believed but it is not intended to be limited to this explanation that the intumescent materials present in coating when fused or "coked" are enmeshed in the reticulated ash structure as a uniform layer of inorganic material and thus impart to the substructure to which the composition roofing is applied a substantial degree of protection against fire.

Having thus described the essence of this invention in detail, it is not the purpose to be limited by the embodiment set forth, but only by the appended claims.

It is claimed:

1. An improved, fire-resistant, asphalt roof covering comprising an asphalt-saturated felt base containing between from about 30 percent to about 55 percent of inorganic fibers and from about 45 percent to about 70 percent of organic fibers, said felt base having applied thereto a coating composition which comprises a vehicle of bituminous thermoplastic material having dispersed therein comminuted unexpanded vermiculite in sufficient quantity to decrease the flowability of said coating composition when the latter is exposed to flame conditions, and mineral granules embedded in said coating.

2. The product of claim 1 in which said coating composition contains from about 12% to 15½% by weight of said vermiculite.

FRANK B. BURNS.
M. S. LARRISON.
MORTON C. HIGGS.

REFERENCES CITED

The following references are of record in the file of this patent:

UNITED STATES PATENTS

| Number | Name | Date |
|---|---|---|
| 737,099 | Hall | Aug. 25, 1903 |
| 1,824,430 | Hall | Sept. 22, 1931 |
| 1,965,703 | Hyde | July 10, 1934 |
| 1,993,343 | Harlow | Mar. 5, 1935 |
| 2,013,349 | Kirschbraun | Sept. 3, 1935 |
| 2,113,794 | Leaute | Apr. 12, 1938 |
| 2,124,843 | Anderton | July 26, 1938 |
| 2,159,586 | Greider et al. | May 23, 1939 |
| 2,217,005 | Clapp | Oct. 8, 1940 |
| 2,317,209 | McCluer et al. | Apr. 20, 1943 |
| 2,317,895 | Drill | Apr. 27, 1943 |
| 2,326,723 | Fasold et al. | Aug. 20, 1943 |
| 2,333,189 | McGrew | Nov. 2, 1943 |

OTHER REFERENCES

Asbestos. Bulletin 403, U. S. Dept. of the Interior, Bureau of Mines. Published by U. S. Gov't Printing Office, Washington, D. C., 1937. Pages 69–71.